United States Patent [19]
Hofgren

[11] Patent Number: 4,754,988
[45] Date of Patent: Jul. 5, 1988

[54] BOAT TRAILER

[76] Inventor: Jon M. Hofgren, 1508 N.W. 55th Terrace, Gainesville, Fla. 32605

[21] Appl. No.: 70,321

[22] Filed: Jul. 6, 1987

[51] Int. Cl.[4] ............................................. B60P 3/10
[52] U.S. Cl. .................................. 280/414.1; 114/344
[58] Field of Search ............... 280/414.1, 414.2, 414.3, 280/63; 114/344; 296/31 P

[56] References Cited

U.S. PATENT DOCUMENTS

| | | | |
|---|---|---|---|
| 3,365,733 | 1/1968 | Gudmundson | 114/344 |
| 3,663,040 | 5/1972 | Weaver et al. | 280/414.1 |
| 3,709,178 | 1/1973 | Piker et al. | 114/344 X |
| 4,573,707 | 3/1986 | Pabst | 296/31 P |
| 4,621,857 | 11/1986 | Jugers | 280/414.1 X |
| 4,664,401 | 5/1987 | Carrick | 280/414.1 |

Primary Examiner—John A. Pekar
Attorney, Agent, or Firm—Thomas B. Tate

[57] ABSTRACT

The invention is a boat trailer which features a wishbone chassis-frame rail which is shaped to precisely fit the hull bottom of the carried craft at a particular index point, and which has a single suspension bridge type bottom flange. The wishbone chassis-frame also has a cam-shaped termination at its back end.

5 Claims, 3 Drawing Sheets though the hull is raised only slightly. This is not enough to affect the vertical position of the hull, but is enough to engage the cam and pivot point at the aft roller 23.

BOAT TRAILER

SUMMARY AND BACKGROUND OF THE INVENTION

Boat trailers for carrying monohull craft over land have a wishbone plan frame-chassis which is welded or bolted together from straight stock or formed from straight stock to produce a narrow neck hitch end of the trailer and a broad section between the trailer wheels that carries the hull.

Conventional wishbone design boat trailers have side rails of steel or aluminum, or fiberglass pulltrusions, and a conventional beam-stress design of two flanges or flange areas separated by a web area. Between the wishbone chassis frame and the boat hull is a system of cribbing or numerous rollers permanently attached to the trailer.

These conventional trailers have two principal drawbacks: (1) They duplicate the fore-aft stiffness of the carried craft's hull, thereby making the trailer excessively heavy and difficult to tow with today's lighter weight cars; (2) Their chassis-frame uses conventional beam-stress design wherein the chassis side rail flanges are alternately in compression and tension are uniform in beam strength.

The object of the present invention is to avoid these problems by providing a much lighter weight chassis-frame design (about half ($\frac{1}{2}$) the weight of most metal trailers), cast in laminate or formed in metal and reinforced.

DESCRIPTION OF THE INVENTION

Figure 1:
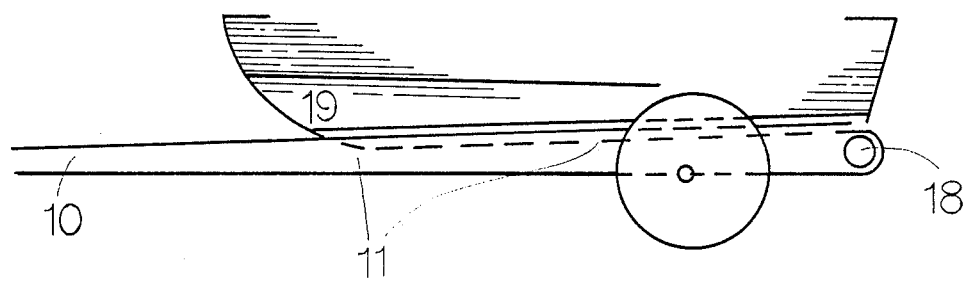
FIG. 1 is a profile view of the monoflange trailer design.

The invention is a precise fitting suspension web monoflange wishbone plan trailer chassis with cam profile loading end. The invention has three principal novel features:

(1) Wishbone chassis-frame rails 10 that are shaped in plan and profile to precisely to fit the hull bottom 11 of the carried craft at a particular hull bottom index point 12; that is, at a horizontal spray rail or inverse A lift plane approximately midway along the hull bottom 11, said precise fit extending for a length that is approximately 70 percent of the carried hull waterline length.

(2) Wishbone chassis-frame rails 10 that have a single suspension bridge type bottom flange 14, and a web 15 which terminates in a slightly compressible, slightly expanded flange seat 16. The flange seat 16 has side compression strength but no end compression strength. The wishbone chassis upper flange seat 16 abuts the carried craft's hull at an external hull hard point 17 that abuts the internal structure of the hull.

(3) A cam-shaped or sloped termination 18 of the loading or back end of the wishbone chassis-frame such that when the hull is under the tension of being hauled onto the trailer, the hull flange (spray rail or lift plane) (12) is raised slightly above the wishbone chassis rail upper flange seat 16, or the pressure between the upper rail 10 and the hull flange is reduced or eliminated to ease forward sliding of the hull onto the trailer. In reverse or unloading procedure, the hull is lifted slightly from the chassis at its forward (bow) and 19, disconnecting the chassis from the hull flange. The boat may now be easily rolled off, or if at an inclined boat launch, allowed to slide off the trailer.

The preferred embodiment of the invention uses fiberglass to attain the lowest weight trailer possible, in part by eliminating all cribbing. However, it should be understood that the best mode for carrying out the invention hereinafter described is offered by way of illustration and not by way of limitation. It is intended that the scope of the invention include all modifications of the invention which incorporate its principal design features.

Figure 8:
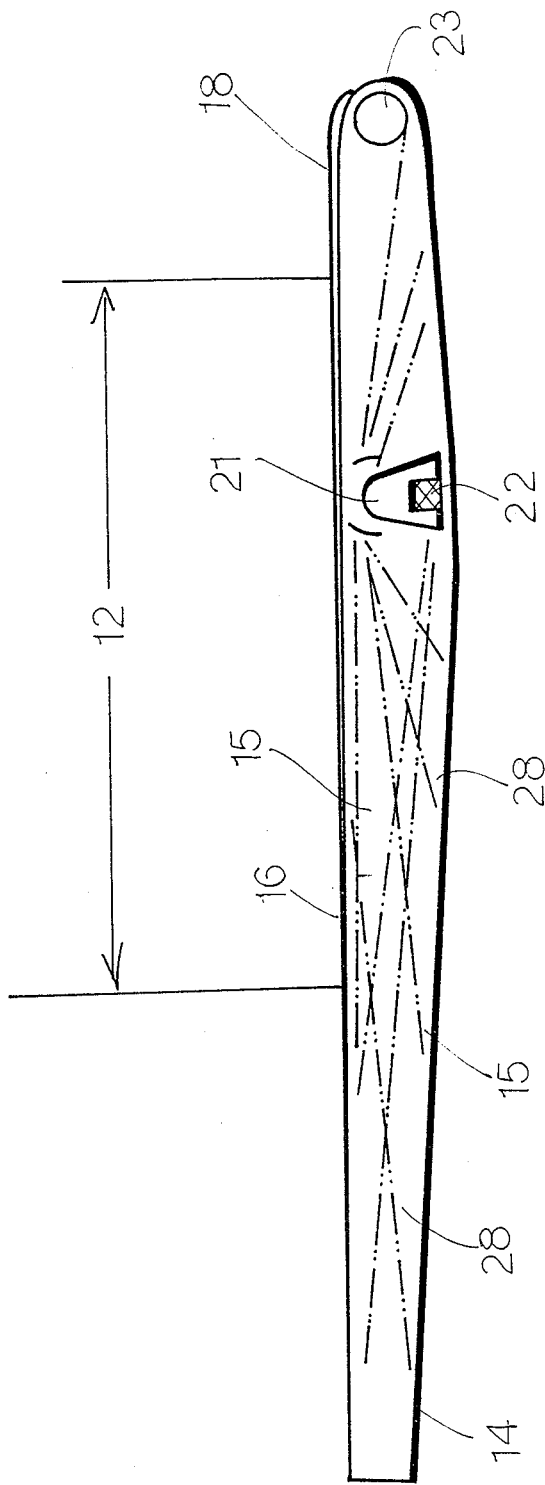
FIG. 8 is a profile detail view of the reinforcement structure for the fiberglass version of the invention.

To make the fiberglass version of the invention, the chassis neck 20 and rails 10 are cast in two or more pieces or in a single U-shaped piece in a cavity mold, and then the pieces are bonded together. The laminate thickness and fiber orientation can be varied to suit the specific strengths needed for stresses likely to be incurred when the boat hull is at rest, during hauling or launching, or during carriage over any expected terrain. The continuous filament reinforcement patterns, examples of which are shown in FIG. 8, are laid during lamination through deep rail suspension/section profile design. There is a heavily reinforced area 21 above the axle 22. The axle 22, which includes a soft rubber torsion suspension, is mounted above the suspension flange 14. The suspension flange 14 is continuous end to end.

Figure 2:
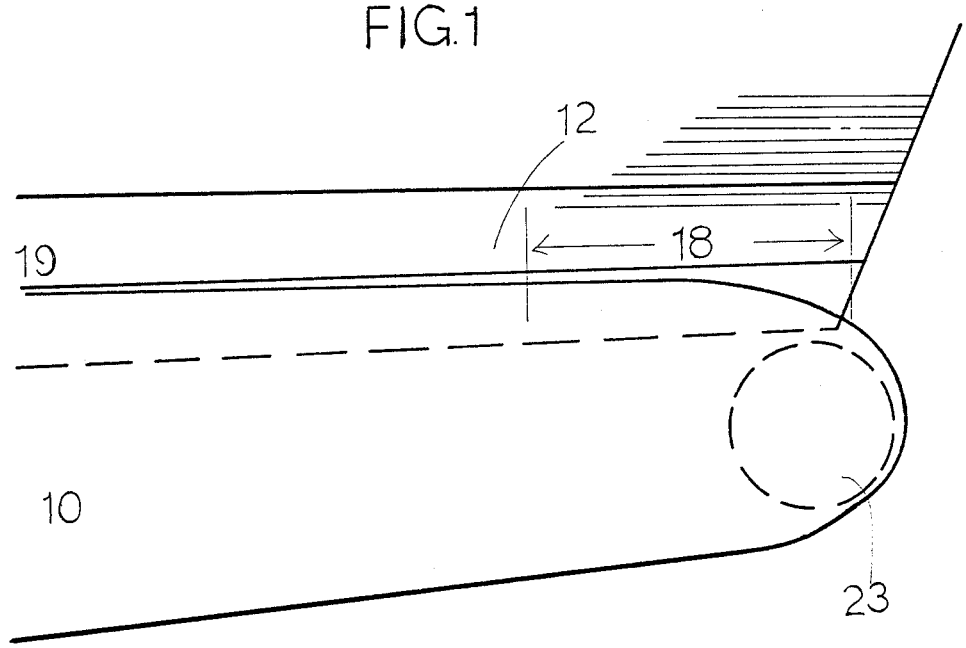
FIG. 2 is a detail view of the cam release loading end.

The wishbone frame cradles the hull in such a way as to provide perfect support. The hull rests in the desired position automatically because the trailer frame dimensions are indexed to the boat hull exterior dimensions, preferably at a horizontal hard point 12, such as a spray rail or inverse A lift plane. When the hull is at indexed rest, as shown in FIG. 2, the keel or lowest point just clears the aft roller 23, which is located at the cam-shaped loading end 18. Any suitable suspension may be used.

Figure 3:
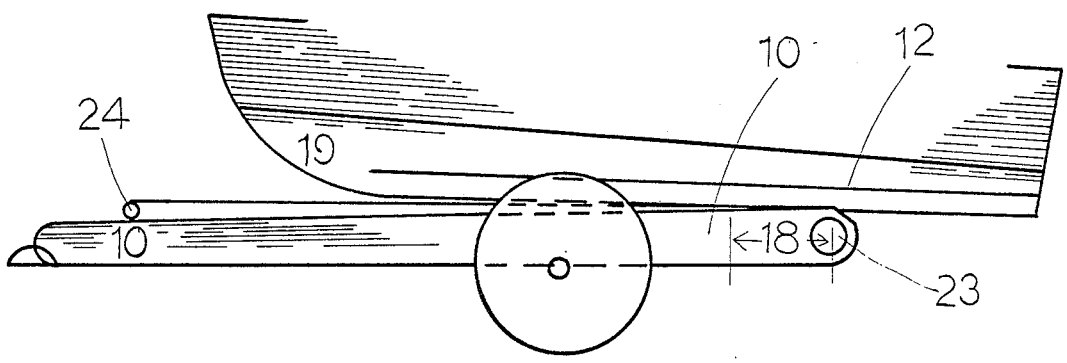
FIG. 3 illustrates the operation of the cam release loading end.
Figure 4:
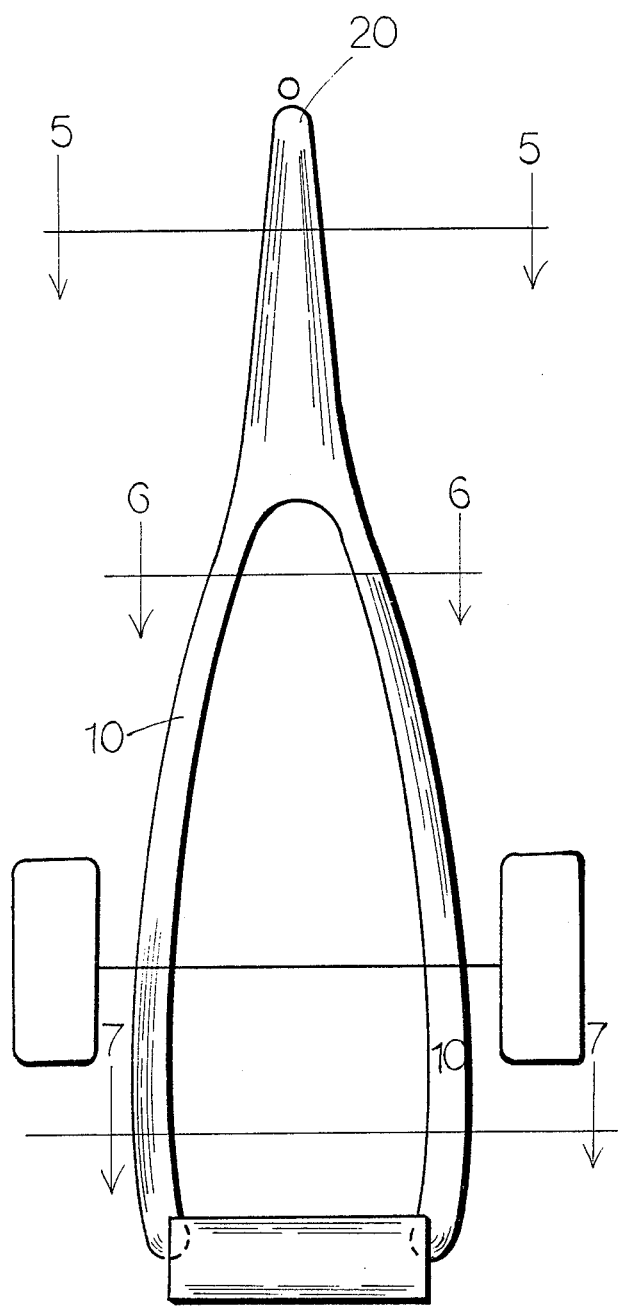
FIG. 4 is a plain view of the monoflange trailer design.
Figure 5:
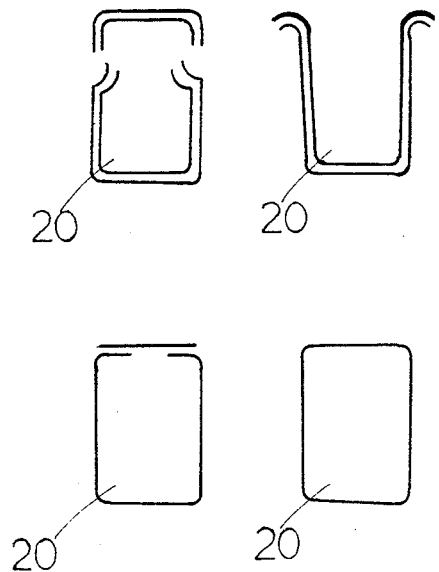
FIG. 5 is a cross sectional view through the forward end of the trailer along line 5—5 of FIG. 4.

The cam or sloped slide rail profile loading end 18 causes the craft to lift off the rails 10 and ride on the single aft roller 23, or pivot point when hauled or launched. Such lift is caused by the tension of hauling or physical small lift of the bow when hauling or launching. The craft reverts to indexed rest when hauling tension or lift is released by means of the winch 24. As shown in FIG. 3, the hauling tension lifts the bow three to ten degrees from horizontal at the same time engaging the aft roller 23 and raising the hull above the chassis sufficiently to ease sliding onto the trailer, or the reverse.

Figure 6:
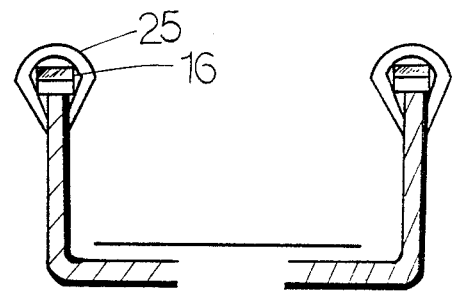
FIG. 6 is a cross sectional view along line 6—6 of FIG. 4, illustrating the flange seat in unloaded position.
Figure 7:
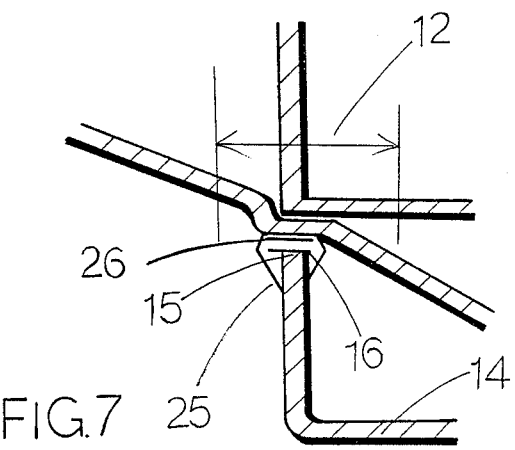
FIG. 7 is a cross sectional view along 7—7 of FIG. 4, illustrating the flange seat in loaded position.

As shown in FIGS. 6 and 7, the flange seat 16 has a semisoft upper portion featuring construction such as a carpet or heavy cloth cover 25 and a flex hard PVC foam core 26, and a lower suspended flange 27. When the boat is loaded, as in FIG. 7, the upper flange area of the boat hull compresses the foam and carpet or cloth of the flange seat 16.

The frame rails 10 are arranged so as to automatically guide and center the craft on the chassis during hauling, during launching, and at any time during carriage. The precise fit of the trailer chassis rail abutment dimensions at an index point 12 on the hull eliminates stress points of load between chassis and craft, thereby reducing the weight of the chassis.

Although composite laminate is the preferred material, this trailer can also be made from sheet metal such as steel or aluminum.

I claim:

1. In a boat trailer for monohull craft, a precise fitting suspension web monoflange wishbone plan trailer chassis with cam profile loading end, said chassis comprising:
   a wishbone chassis-frame rail shaped to fit precisely to the hull bottom of a carried craft at a particular hull bottom index point;
   said wishbone chassis-frame rail having a single suspension bridge type bottom flange and a web which terminates in a flange seat, said flange seat abutting said carried craft's hull at an external hard point which abuts the internal structure of said hull;
   said wishbone chassis-frame having a cam-shaped, sloped termination of its rear facing and which allows the forward end of said hull to be raised slightly above said chassis when said craft is being loaded or unloaded.

2. The invention of claim 1 wherein said hull bottom index point is located approximately midway along said hull bottom, and wherein the distance from said index point to said back end is approximately 70 percent of the carried hull waterline length.

3. The invention of claim 1 wherein said flange seat is slightly compressible, and has side compression strength but no end compression strength.

4. The invention of claim 1 wherein the load bearing part is a cast suspension web beam of composite laminate such as fiberglass.

5. The invention of claim 4 wherein said cast laminate load bearing beam is precisely patterned to fit the carried hull.

* * * * *